(12) United States Patent
Bang et al.

(10) Patent No.: US 7,580,572 B2
(45) Date of Patent: Aug. 25, 2009

(54) SPATIAL MOTION RECOGNITION SYSTEM AND METHOD USING A VIRTUAL HANDWRITING PLANE

(75) Inventors: Won-chul Bang, Sungnam-si (KR); Dong-yoon Kim, Seoul (KR); Wook Chang, Seoul (KR); Kyoung-ho Kang, Yongin-si (KR); Eun-seok Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 713 days.

(21) Appl. No.: 10/801,593

(22) Filed: Mar. 17, 2004

(65) Prior Publication Data
US 2004/0184640 A1     Sep. 23, 2004

(30) Foreign Application Priority Data
Mar. 17, 2003  (KR) ...................... 10-2003-0016410

(51) Int. Cl.
*G06K 9/18*     (2006.01)
(52) U.S. Cl. ..................... 382/186; 382/122; 382/185
(58) Field of Classification Search ................ 382/122, 382/186
See application file for complete search history.

(56) References Cited

U.S. PATENT DOCUMENTS 4,862,152 A * 8/1989 Milner ....................... 345/158
5,499,306 A * 3/1996 Sasaki et al. ................. 382/291
2003/0001818 A1 * 1/2003 Katagiri et al. .............. 345/158

FOREIGN PATENT DOCUMENTS

| JP | 2001-356875 A | 12/2001 |
| WO | WO 95/21436 A1 | 8/1995 |
| WO | WO 2004/029866 A1 | 4/2004 |
| WO | WO 2004/059569 A1 | 7/2004 |

* cited by examiner

*Primary Examiner*—Yosef Kassa
*Assistant Examiner*—Edward Park
(74) *Attorney, Agent, or Firm*—Sughrue Mion, PLLC

(57) ABSTRACT

A spatial motion recognition system capable of recognizing motions in three-dimensional space as handwritings on a two-dimensional plane is provided. The system recognizes motions of a system body occurring in space based on position change information of the system body that is detected in a motion detection unit, displays the recognized motion information on a screen, or transmits to an external device the recognized motion information through a transmission/reception unit or a control signal corresponding to the motion information. A control unit produces a virtual handwriting plane having the shortest distances with respect to respective positions in predetermined time intervals based on three-dimensional track information obtained through tracking, and projects the respective positions in the predetermined time intervals onto the virtual handwriting plane to recover the motions in space.

14 Claims, 5 Drawing Sheets

SPATIAL MOTION RECOGNITION SYSTEM AND METHOD USING A VIRTUAL HANDWRITING PLANE

CROSS-REFERENCE TO RELATED APPLICATIONS

This application claims the priority of Korean Patent Application No. 2003-16410, filed on Mar. 17, 2003, in the Korean Intellectual Property Office, the disclosure of which is incorporated herein in its entirety by reference.

BACKGROUND OF THE INVENTION

1. Field of the Invention

An apparatus consistent with the present invention relates to a spatial motion recognition system and, more particularly, to a system and method for recognizing motions occurring in space.

2. Description of the Related Art

Recently, the market for personal mobile devices such as personal digital assistants (PDAs), cellular phones, computer notebooks, and so on, has been widely spread. Such personal mobile devices are best suited for ubiquitous environments for utilizing information anytime and anywhere since they are easy to carry. That is, recent mobile devices enable users to utilize information even during their movements so that the users can use information any time and anywhere, unlike the past environments which confined information utilization to desktop personal computers (PCs) installed at a fixed location.

However, such mobile devices have become smaller in an overall size in order to be easily carried, which causes a problem that users feel somewhat awkward or inconvenienced in recognitions and command inputs through a small display unit. In such mobile devices, portability runs counter to being easy to input and output information, so research and development has been continuously made on methods for overcoming these problems.

Recently, a pen-shaped input system has emerged as a means through which users use the mobile devices more conveniently. A general pen-shaped input system is designed to recognize writing motions or selecting motions which are inputted through a tool on the two-dimensional plane or pad so that the pen-shaped input system displays writings on a display unit or performs corresponding operations based on recognized information.

FIG. 1 illustrates an input style for a conventional pen-shaped input system. The pen-shaped input system has a stylus pen part 10 capable of being held in a user's hand so that a user can write or select motions with it, and a display part 22, which may be a PDA 20, for example, that recognizes menu selection commands and/or writing motions from a contact state of a portion of the stylus pen part 10 on the two-dimensional plane of the display part 22 and displays corresponding operations based on a selected menu or handwritings. The pen part 10 operates as a pointing tool or handwriting tool without an extra power supply, and the PDA 20 processes a signal corresponding to a portion of the display part 22 on which the tip portion of the pen part 10 is placed.

The pen-shaped input system described above decides what information is inputted depending upon positions in which the pen part 10 contacts with the two-dimensional plane of the display part 22. That is, if a current view displayed on the display part 22 is a view displaying menus, the PDA 20 decides information corresponding to a position with which the tip portion of the pen part 10 is in contact as menu selection information, and performs a corresponding command based on information on the selected position. Further, if a view capable of recognizing handwritings is displayed, the PDA 20 obtains information on contact positions of the pen part 10 that are continuously changing, and displays on the display part 22 the handwritings from the obtained information.

However, the above pen-shaped input system is inconvenient since users have to perform their menu selections or handwriting motions on the limited view of the display part 22.

Meanwhile, other systems have been proposed for measuring or detecting the coordinate changes of the pen tip in three axial angles outside the pen or through ultrasonic waves or the like, for other types of conventional pen-shaped input systems. Further, there has been proposed a system for detecting the changes of the pen tip used in charge-coupled device (CCD) cameras. For yet other types of conventional pen-shaped input systems, U.S. Pat. No. 6,181,329 (laid-open Jan. 30, 2001) and U.S. Pat. No. 6,212,296 (laid-open Apr. 3, 2001) disclose systems extracting motion information and recognizing input information inside the pen based on motions performed on the two-dimensional plane or in three-dimensional space.

However, problems exist in the systems extracting coordinate changes outside the pen, such as the systems using three axial angles, ultrasonic waves, CCD cameras, and so on, since there is a high possibility of recognition errors if the pen is interfered with by a hand or other object. Further, the pen-shaped input systems disclosed in U.S. Pat. Nos. 6,181,329 and 6,212,296 extract motion information and recognize motions based on pen motions performed on the two dimensional plane or in the three dimensional space, so users can input information without any limit to handwriting space, but, when pen motions occur in the three-dimensional space, there exists a problem that handwritings can be wrongly recovered and displayed differently from users' intents since users can not make handwriting motions precisely on an arbitrary plane in space. For example, as a user performs motions for writing the number "2" as shown in FIG. 2 in space, the positions of points appearing when segmenting the handwriting motions of the number "2" in predetermined time intervals do not exist on any one plane corresponding to each other, so they may appear somewhat compact or as a completely different symbol depending upon recognition directions, which also causes a high possibility of recognition error occurrences. FIG. 3 illustrates a shape of the number "2" based on the handwriting motions of FIG. 1 which appears when viewed in a different direction. Accordingly, the pen-shaped input systems disclosed in the above-mentioned United States Patents can reduce recognition errors when the pen tip contacts the two-dimensional writing surface, but they are not easy to utilize in space.

SUMMARY OF THE INVENTION

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

An apparatus consistent with the present invention provides a spatial motion recognition system and a method capable of improving recognition capability of handwriting motions in space without any extra writing surface provided.

In order to achieve the above aspect, an exemplary embodiment of a spatial motion recognition system according to the present invention comprises a motion detection unit for outputting, as an electric signal position, changes based on motions of a body of the system in space. A control unit for tracking three-dimensional motions of the system body based on the electric signal outputted from the motion detection unit, produces a virtual handwriting plane having the shortest distances with respect to respective positions in predetermined time intervals based on three-dimensional track information obtained through tracking, and projects the respective positions in the predetermined time intervals onto the virtual handwriting plane to recover the motions in space.

Further, the control unit rotation-converts the tracks of the virtual handwriting plane into a two-dimensional plane of x and y axes in order to reproduce the tracks projected onto the virtual handwriting plane on the two-dimensional plane.

In the meantime, in order to achieve the above aspect, a spatial motion recognition method for a motion recognition system comprises steps of obtaining three-dimensional track information on a system body in space; producing a virtual handwriting plane having the shortest distances with respect to respective positions in predetermined time intervals based on the obtained three-dimensional track information; and projecting the positions in the predetermined time intervals onto the virtual handwriting plane and recovering the motions in space.

Further, the spatial motion recognition method further comprises a step of rotation-converting the tracks of the virtual handwriting plane into a two-dimensional plane of x and y axes in order to reproduce the tracks projected onto the virtual handwriting plane on the two-dimensional plane.

As provided above, the spatial motion recognition system and method according to the present invention enables users to input information regardless of a handwriting area, enabling precise motion recognitions for handwriting motions in space without providing an extra handwriting surface, since the system and method can recover users' handwriting motions in space just like the handwritings users perform on the surface of a plane.

BRIEF DESCRIPTION OF THE DRAWINGS

The features and advantages of the present invention will become more apparent by describing in detail exemplary embodiments thereof with reference to the accompanying drawings in which like reference numerals refer to like elements, and wherein.

DETAILED DESCRIPTION OF ILLUSTRATIVE, NON-LIMITING EMBODIMENTS OF THE INVENTION

Hereinafter, the present invention will be described in detail with reference to the accompanying drawings.

Figure 1:
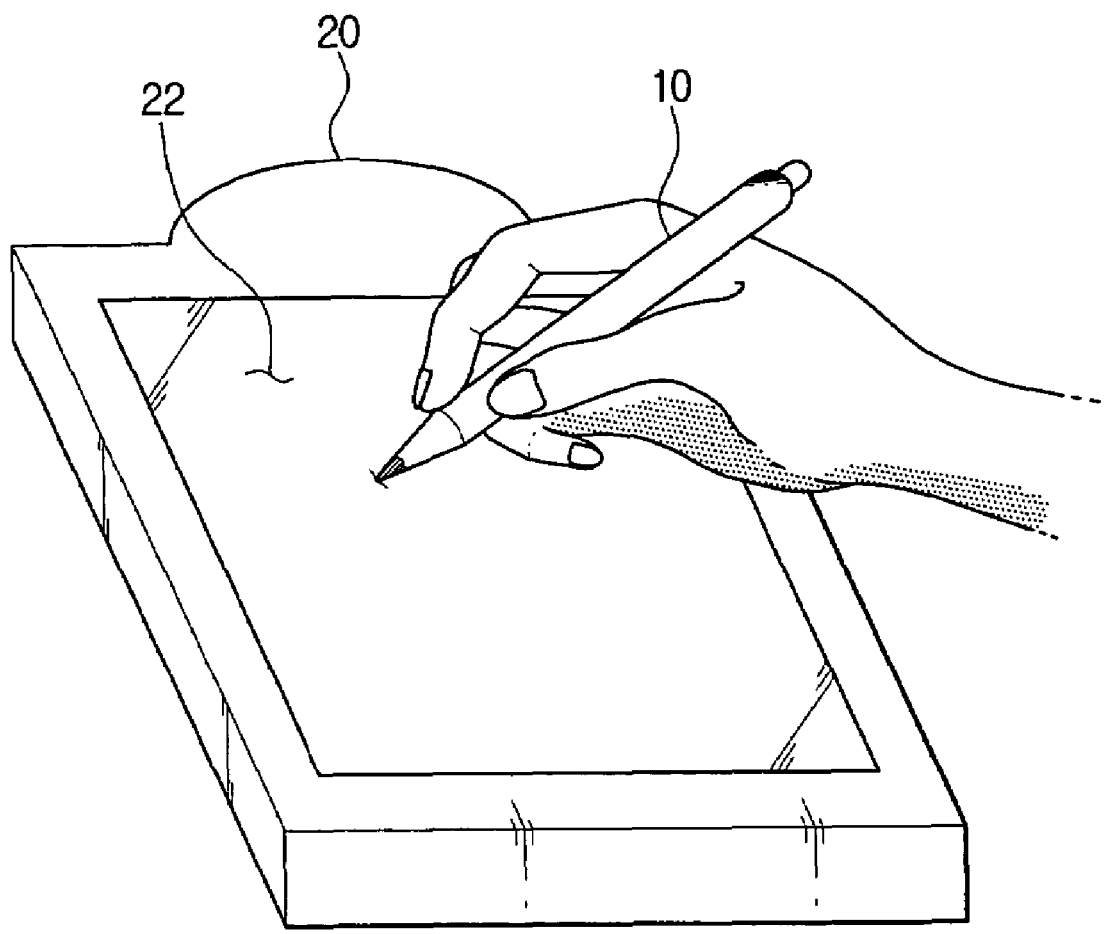
FIG. 1 is a view for showing an exemplary input style for a conventional pen-shaped input system.
Figure 2:
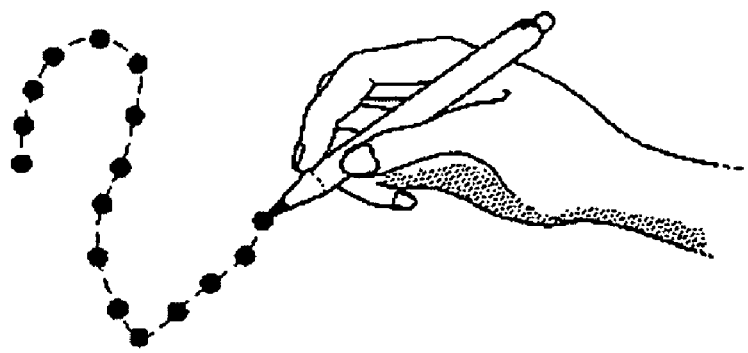
FIG. 2 is a view for showing handwriting motions of the number "2" in space.
Figure 3:
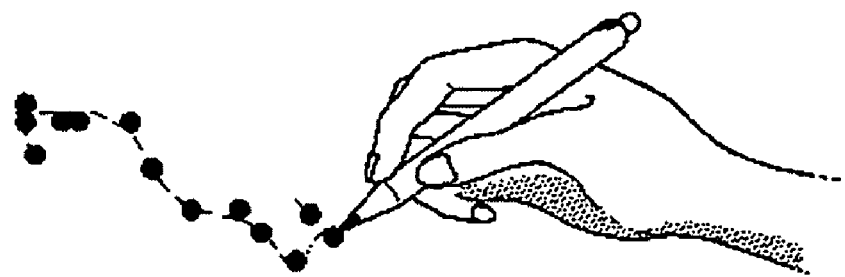
FIG. 3 is a view for showing the handwriting motions of FIG. 2 when viewed in a different direction.
Figure 4:
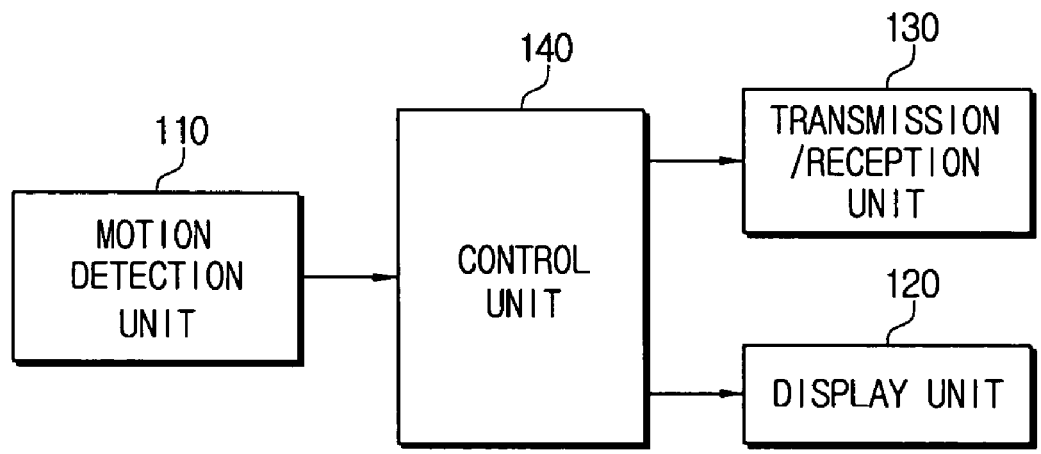
FIG. 4 is a block diagram for showing a spatial motion recognition system according to an embodiment of the present invention.
Figure 5:
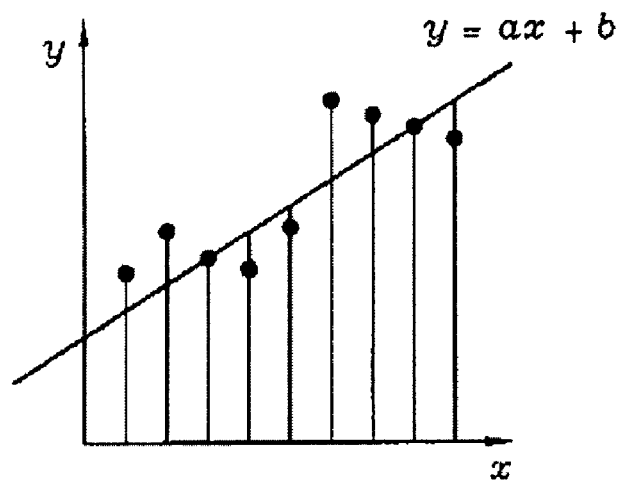
FIG. 5 is a view for explaining a process for finding out straight lines having shortest distances with respect to respective points on the two-dimensional plane.

FIG. 4 is a schematic block diagram for showing a spatial motion recognition system according to an embodiment of the present invention. A system 100 includes a motion detection unit 110, a display unit 120, a transmission/reception unit 130, and a control unit 140.

The motion detection unit 110 continuously detects the position changes of a system body. In order to do so, the motion detection unit 110 has plural gyro sensors, plural acceleration sensors, and a computing circuit for performing computations on electric signals transferred from respective sensors.

The display unit 120 displays the motions of the system body on a screen. Here, the display unit 120 may be built in a recognition system to be incorporated into one body, and, further, include a displayable means built in a different system.

The transmission/reception unit 130 transmits to an external system motion information recognized under control of a control unit 140 or a control signal corresponding to the motion information.

The control unit 140 recognizes system body motions occurring in space based on information of system body position changes that is detected from the motion detection unit 110, and then displays the recognized motion information on the display unit 120 or transmits to a different system a control signal corresponding to the recognized motion information or the motion information through the transmission/reception unit 130. At this time, the control unit 140 performs a process for producing a virtual handwriting plane from the position change information detected through the motion detection unit 110 in order to recognize the system body motions, and a process for projecting the motion track information of the system body onto the produced virtual handwriting plane. Further, the control unit 140 performs a process for carrying out a rotation conversion of the motion tracks projected on the virtual handwriting plane into a two-dimensional plane in order to display the obtained motion information on the display unit 120.

The process for determining the virtual handwriting plane in the control unit 140 can be referred to as a process for determining a plane most adjacent to respective points, in a state that handwriting tracks in the three-dimensional space are first established as a set of points. This can be achieved by expanding into the three-dimensions a process for finding out straight lines having the shortest distances with respect to the respective points of tracks on the two-dimensional plane.

First, when points obtained through tracks handwritten on the two-dimensional plane are referred to as $P_i=(x_i, y_i)$ wherein i=1, . . . , m, a straight line having the shortest distance from Pi can be expressed in a straight line of the form y=ax+b. Further, the straight line of y=ax+b can be obtained by using Equation 1 and Equation 2 as follows from coordinate values of points obtained based on handwriting motions on the two-dimensional plane.

$$E = \sum_{i=1}^{m} (ax_i + b - y_i)^2,$$ [Equation 1]

wherein E denotes a sum of the square of distances of the points spaced away from a straight line of y=ax+b, a denotes a slope of the line, and b denotes an intercept of the line.

$$\frac{\partial E}{\partial a} = 0 \text{ and } \frac{\partial E}{\partial b} = 0 \qquad \text{[Equation 2]}$$

That is, the straight line of the form y=ax+b can be obtained through the partial differentiation of E by a and b after calculating E which is a sum of the square of distances to a virtual line from respective points.

Figure 6:
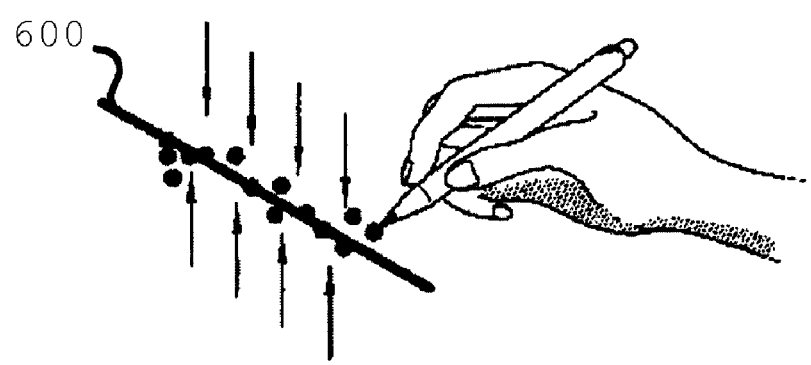
FIG. 6 and FIG. 7 are views for showing a process for finding out a virtual handwriting plane and a process for projecting three-dimensional motions in the spatial motion recognition system of FIG. 4.

However, when performing handwriting motions in the three-dimensional space, a user performs the handwriting motions while assuming that there is a virtual plane in the three-dimensional space, but the points actually appearing when handwriting tracks are segmented in predetermined time intervals do not correspond to the virtual plane the user has assumed. FIG. 6 is a view for representing tracks based on a user's handwriting motions in the three-dimensional space by use of points with reference to a virtual handwriting plane 600. Accordingly, the present invention produces a virtual handwriting plane 600 to recognize users' handwriting motions in the three-dimensional space as the handwriting motions in the two-dimensional plane. A process for determining a virtual handwriting plane 600 virtually in three-dimensional space can be obtained by expanding into the three-dimension a process for finding straight lines having the shortest distance in use of the linear regression method with respect to points on the two-dimensional plane.

In the process for producing a virtual handwriting plane based on handwriting motions in the three-dimensional space, the virtual handwriting plane can be assumed in Equation 3 as follows when points obtained based on motions handwritten in the three-dimensional space are referred to as $P_i=(x_i, y_i, z_i)$ wherein i=1, ..., m.

$$z = \alpha x + \beta y + \gamma \qquad \text{[Equation 3]}$$

Further, obtained in the process is a sum of the square of distances to the virtual plane from the m points in the three-dimensional space. Equation 4 as follows expresses the sum of the square of distances to the virtual plane from the m points in the three-dimensional space.

$$E = \sum_{i=1}^{m} (\alpha x_i + \beta y_i + \gamma - z_i)^2 \qquad \text{[Equation 4]}$$

Further, in order for the E to have the minimum value with respect to the parameters $\alpha$, $\beta$, and $\gamma$, Equation 5 as follows has to be satisfied.

$$\frac{\partial E}{\partial \alpha} = 0 \text{ and } \frac{\partial E}{\partial \beta} = 0 \text{ and } \frac{\partial E}{\partial \gamma} = 0 \qquad \text{[Equation 5]}$$

Further, the parameters $\alpha$, $\beta$, and $\gamma$ for a virtual handwriting plane from the Equations 3, 4, and 5 can be obtained through Equation 6 as follows.

$$\begin{bmatrix} \sum_{i=1}^{m} x_i^2 & \sum_{i=1}^{m} x_i y_i & \sum_{i=1}^{m} x_i \\ \sum_{i=1}^{m} x_i y_i & \sum_{i=1}^{m} y_i^2 & \sum_{i=1}^{m} y_i \\ \sum_{i=1}^{m} x_i & \sum_{i=1}^{m} y_i & m \end{bmatrix} \begin{bmatrix} \alpha \\ \beta \\ \gamma \end{bmatrix} = \begin{bmatrix} \sum_{i=1}^{m} z_i x_i \\ \sum_{i=1}^{m} y_i z_i \\ \sum_{i=1}^{m} z_i \end{bmatrix} \qquad \text{[Equation 6]}$$

wherein $x_i$, $y_i$, $z_i$ are coordinates of the system body that is tracked at a predetermined time in the three-dimensional space, and $\alpha$, $\beta$, and $\gamma$ are parameters for a virtual handwriting plane.

Figure 7:
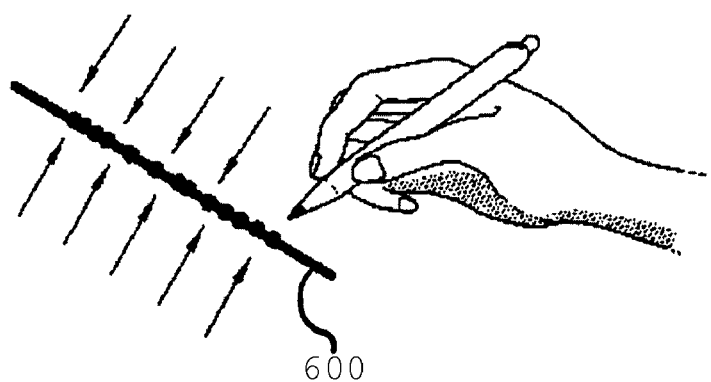
Figure 8:
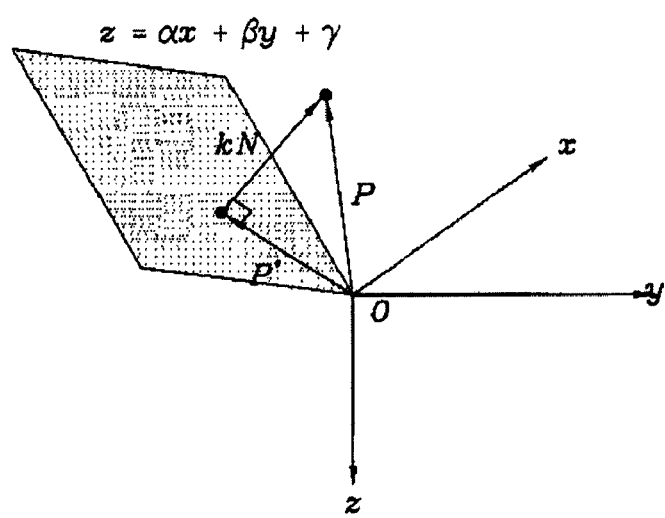
FIG. 8 is a view for showing vector relations for obtaining projection positions in order to project the three-dimensional motions on the virtual handwriting plane.

If the parameters for a virtual handwriting plane are obtained, the control unit 140 recognizes a virtual plane having the shortest distances with respect to other points of three-dimensional tracks. Thereafter, the control unit 140 performs a process for projecting the respective points of the three-dimensional tracks onto the points nearest a virtual handwriting plane 600 as shown in FIG. 7. The nearest distance to the virtual handwriting plane 600 from the points of the three-dimensional tracks becomes scalar times the normal vector with respect to the virtual handwriting plane 600 at respective points as shown in FIG. 8, so Equation 7 as follows can be expressed:

$$P - P' = kN, \qquad \text{[Equation 7]}$$

wherein P is a vector based on tracks on the three-dimensional space, P' is a vector projected on a virtual handwriting plane, and N is a normal vector for the virtual handwriting plane. Points, $P'_i(x_i', y_i', z_i')$ wherein i=1, ..., m, which are projected on the virtual handwriting plane by the above Equation 7 can be obtained through Equation 8 as follows:

$$x_i' = x_i - \frac{a(ax_i + by_i + cz_i + d)}{a^2 + b^2 + c^2} \qquad \text{[Equation 8]}$$
$$y_i' = y_i - \frac{b(ax_i + bx_i + cz_i + d)}{a^2 + b^2 + c^2}$$
$$z_i' = z_i - \frac{c(ax_i + bx_i + cz_i + d)}{a^2 + b^2 + c^2}$$

The projection process as above recovers tracks in space into tracks on plane.

Thereafter, the control unit 140 performs a process of rotating the tracks on a virtual handwriting plane by $\theta$ degrees about the y axis and by $\Phi$ degrees about the x axis so that the tracks on the virtual handwriting plane can be reproduced on the two-dimensional plane.

The rotation-converted tracks are obtained through Equation 9 as follows:

$$\begin{bmatrix} x_i'' \\ y_i'' \\ z_i'' \end{bmatrix} = \begin{bmatrix} 1 & 0 & 0 \\ 0 & \cos\phi & -\sin\phi \\ 0 & \sin\phi & \cos\phi \end{bmatrix} \begin{bmatrix} \cos\theta & 0 & \sin\theta \\ 0 & 1 & 0 \\ -\sin\theta & 0 & \cos\theta \end{bmatrix} \begin{bmatrix} x_i' \\ y_i' \\ z_i' \end{bmatrix} \qquad \text{[Equation 9]}$$

$$\phi = \arctan 2(-b, -c)$$
$$\theta = \arctan 2(a, \sqrt{b^2 + c^2})$$

wherein $(x_i', y_i', z_i')$ is a three-dimensional coordinate when tracks are segmented in predetermined time intervals and then the $i^{th}$ position of $(x_i, y_i, z_i)$ is projected on a virtual handwriting plane, $(x_i'', y_i'', z_i'')$ is a coordinate of a point obtained when the $i^{th}$ position of the projected tracks is rotated by $\theta$ degrees about the y axis and rotated by $\phi$ degrees about the x axis.

Since the rotation-converted point exists on an x-y plane, a value of $z_i$ becomes zero (0).

As above, if track information of a virtual handwriting plane is rotated and moved to the two-dimensional plane of x and y axes, the control unit 140 can display three-dimensional motions as two-dimensional information on a screen of the display unit 120 through the rotated and moved information, and the transmission/reception unit 130 transfers the two-dimensional information to a different system.

As described above, since the spatial motion recognition system and method according to the present invention recognizes motions in space as handwriting motions on a two-dimensional plane, the system and method are capable of precise motion recognition without requiring an extra handwriting surface, to thereby promote users' convenience, and the system and method enable a user to input information regardless of a handwriting area so as to greatly improve problems associated with inputting information in ubiquitous environments.

Further, the system and method recognize handwriting motions in space as those on the existing two-dimensional plane, so that they can solve the obscure handwriting recognition problem.

While the invention has been shown and described with reference to exemplary embodiments thereof for illustrative purposes, it will be understood by those skilled in the art that various changes in form and details may be made therein without departing from the spirit and scope of the invention as defined by the appended claims.

What is claimed is:

1. A spatial motion recognition system, comprising:
   a motion detection unit for outputting position changes of a body of the system in space as an electric signal based on three-dimensional motions of the system body;
   a control unit for receiving the electric signal outputted from the motion detection unit,
   wherein the control unit:
   tracks the three-dimensional motions of the system body based on the electric signal outputted from the motion detection unit,
   produces a virtual handwriting plane located in three-dimensional space, wherein a location of the virtual handwriting plane is a plane which is most adjacent to a set of respective points which correspond to the tracked three-dimensional motions of the system body in predetermined time intervals, and
   projects the respective points corresponding to the tracked three-dimensional motions of the system body in the predetermined time intervals onto the virtual handwriting plane as motion tracks,
   carries out a rotation conversion of the motion tracks projected on the virtual handwriting plane into a two-dimensional plane of x and y axes; and
   a display unit for displaying the two-dimensional plane outputted by the control unit.

2. The spatial motion recognition system as claimed in claim 1, wherein the control unit calculates the rotation-converted tracks by the following equation:

$$\begin{bmatrix} x_i'' \\ y_i'' \\ z_i'' \end{bmatrix} = \begin{bmatrix} 1 & 0 & 0 \\ 0 & \cos\phi & -\sin\phi \\ 0 & \sin\phi & \cos\phi \end{bmatrix} \begin{bmatrix} \cos\theta & 0 & \sin\theta \\ 0 & 1 & 0 \\ -\sin\theta & 0 & \cos\theta \end{bmatrix} \begin{bmatrix} x_i' \\ y_i' \\ z_i' \end{bmatrix}$$

$$\phi = \arctan 2(-b, -c)$$

$$\theta = \arctan 2(a, \sqrt{b^2 + c^2})$$

wherein $(x_i', y_i', z_i')$ are three-dimensional coordinates when the tracks are segmented in the predetermined time intervals and then the $i^{th}$ position of $(x_i, y_i, z_i)$ is projected on the virtual handwriting plane, and $(x_i'', y_i'', z_i'')$ are coordinates of a point obtained when the $i^{th}$ position of the projected tracks is rotated by $\theta$ degrees about the y axis and rotated by $\phi$ degrees about the x axis.

3. The spatial motion recognition system as claimed in claim 1, wherein the control unit calculates the virtual handwriting plane by performing a linear regression operation.

4. The spatial motion recognition system as claimed in claim 1, wherein the control unit calculates the virtual handwriting plane by performing a least squares regression operation.

5. The spatial motion recognition system as claimed in claim 1, wherein the motion detection unit outputs position changes of the system body in space based on a continuous detection of the position changes of the system body using at least one gyro sensor and at least one acceleration sensor.

6. A spatial motion recognition system, comprising:
   a motion detection unit for outputting position changes of a body of the system in space as an electric signal based on three-dimensional motions of the system body; and
   a control unit for tracking three-dimensional motions of the system body based on the electric signal outputted from the motion detection unit, producing a virtual handwriting plane having the shortest distances with respect to respective positions in predetermined time intervals based on three-dimensional track information obtained through tracking, and projecting the respective positions in the predetermined time intervals onto the virtual handwriting plane to recover the motions in space,
   wherein the control unit calculates the virtual handwriting plane having the shortest distances with respect to positions in the predetermined time intervals, using the following equation:

$$\begin{bmatrix} \sum_{i=1}^{m} x_i^2 & \sum_{i=1}^{m} x_i y_i & \sum_{i=1}^{m} x_i \\ \sum_{i=1}^{m} x_i y_i & \sum_{i=1}^{m} y_i^2 & \sum_{i=1}^{m} y_i \\ \sum_{i=1}^{m} x_i & \sum_{i=1}^{m} y_i & m \end{bmatrix} \begin{bmatrix} \alpha \\ \beta \\ \gamma \end{bmatrix} = \begin{bmatrix} \sum_{i=1}^{m} z_i x_i \\ \sum_{i=1}^{m} y_i z_i \\ \sum_{i=1}^{m} z_i \end{bmatrix}$$

wherein $(x_i, y_i, z_i)$ are coordinates of the system body that is tracked at a predetermined time in three-dimensional space, and $\alpha$, $\beta$, and $\gamma$ are parameters for the virtual handwriting plane.

7. A spatial motion recognition system comprising:
   a motion detection unit for outputting position changes of a body of the system in space as an electric signal based on three-dimensional motions of the system body; and a control unit for tracking three-dimensional motions of the system body based on the electric signal outputted from the motion detection unit, producing a virtual handwriting plane having the shortest distances with respect to respective positions in predetermined time intervals based on three-dimensional track information obtained through tracking, and projecting the respective positions in the predetermined time intervals onto the virtual handwriting plane to recover the motions in space, wherein the control unit calculates tracks of the positions in the predetermined time intervals that are projected onto the virtual handwriting plane by the following equation:

$$x'_i = x_i - \frac{a(ax_i + by_i + cz_i + d)}{a^2 + b^2 + c^2}$$

$$y'_i = y_i - \frac{b(ax_i + bx_i + cz_i + d)}{a^2 + b^2 + c^2}$$

$$z'_i = z_i - \frac{c(ax_i + bx_i + cz_i + d)}{a^2 + b^2 + c^2}$$

wherein $(x_i, y_i, z_i)$ are three-dimensional coordinates when the electric signal obtained based on motion occurrences of the system body in the three-dimensional space is divided in the predetermined time intervals, $(x'_i, y'_i, z'_i)$ are coordinates obtained when an arbitrary position of $(x_i, y_i, z_i)$ in the predetermined time intervals are projected onto the virtual handwriting plane, and a, b, c, and d are parameters for the virtual handwriting plane.

8. A spatial motion recognition method for a motion recognition system, comprising:
   at least one control unit that implements the steps of:
   obtaining three-dimensional track information on a system body in space;
   producing a virtual handwriting plane virtually in three-dimensional space, wherein a location of the virtual handwriting plane is a plane which is most adjacent to a set of respective points which correspond to the obtained three-dimensional track information of the system body in predetermined time intervals; and
   projecting the respective points corresponding to the tracked three-dimensional motions of the system body in the predetermined time intervals onto the virtual handwriting plane as motion tracks;
   carrying out a rotation conversion of the motion tracks projected on the virtual handwriting plane into a two-dimensional plane of x and y axes; and
   outputting the two-dimensional plane to a display unit for display.

9. The spatial motion recognition method as claimed in claim 8, wherein the rotation-converted tracks are calculated by the following equation:

$$\begin{bmatrix} x''_i \\ y''_i \\ z''_i \end{bmatrix} = \begin{bmatrix} 1 & 0 & 0 \\ 0 & \cos\phi & -\sin\phi \\ 0 & \sin\phi & \cos\phi \end{bmatrix} \begin{bmatrix} \cos\theta & 0 & \sin\theta \\ 0 & 1 & 0 \\ -\sin\theta & 0 & \cos\theta \end{bmatrix} \begin{bmatrix} x'_i \\ y'_i \\ z'_i \end{bmatrix}$$

$$\phi = \arctan2(-b, -c)$$

$$\theta = \arctan2\left(a, \sqrt{b^2 + c^2}\right)$$

wherein $(x'_i, y'_i, z'_i)$ are three-dimensional coordinates when the tracks are segmented in the predetermined time intervals and then the $i^{th}$ position of $(x_i, y_i, z_i)$ is projected on the virtual handwriting plane, and $(x''_i, y''_i,$ $z''_i)$ are coordinates of a point obtained when the $i^{th}$ position of the projected tracks is rotated by $\theta$ degrees about the y axis and rotated by $\phi$ degrees about the x axis.

10. The spatial motion recognition method as claimed in claim 8, wherein the virtual handwriting plane is determined by performing a linear regression operation.

11. The spatial motion recognition method as claimed in claim 8, wherein the control unit calculates the virtual handwriting plane by performing a least squares regression operation.

12. The spatial motion recognition method as claimed in claim 8, wherein the obtaining of the three-dimensional track information on the system body in space is based on a continuous detection of the position changes of the system body using at least one gyro sensor and at least one acceleration sensor.

13. a spatial motion recognition method for a motion recognition system, comprising:
   at least one control unit that implements the steps of:
   obtaining three-dimensional track information on a system body in space;
   producing a virtual handwriting plane having the shortest distances with respect to respective positions in predetermined time intervals based on the obtained three-dimensional track information; and
   projecting the positions in the predetermined time intervals onto the virtual handwriting plane and recovering the motions in space,
   wherein the virtual handwriting plane is calculated by the following equation:

$$\begin{bmatrix} \sum_{i=1}^{m} x_i^2 & \sum_{i=1}^{m} x_i y_i & \sum_{i=1}^{m} x_i \\ \sum_{i=1}^{m} x_i y_i & \sum_{i=1}^{m} y_i^2 & \sum_{i=1}^{m} y_i \\ \sum_{i=1}^{m} x_i & \sum_{i=1}^{m} y_i & m \end{bmatrix} \begin{bmatrix} \alpha \\ \beta \\ \gamma \end{bmatrix} = \begin{bmatrix} \sum_{i=1}^{m} z_i x_i \\ \sum_{i=1}^{m} y_i z_i \\ \sum_{i=1}^{m} z_i \end{bmatrix}$$

wherein $(x_i, y_i, z_i)$ are coordinates of the system body that is tracked at a predetermined time in the three-dimensional space, and $\alpha$, $\beta$, and $\gamma$ are parameters for the virtual handwriting plane.

14. A spatial motion recognition method for a motion recognition system, comprising:
   at least one control unit that implements the steps of:
   obtaining three-dimensional track information on a system body in space;
   producing a virtual handwriting plane having the shortest distances with respect to respective positions n predetermined time intervals based on the obtained three-dimensional track information; and
   projecting the positions in the predetermined time intervals onto the virtual handwriting plane and recovering the motions in space
   wherein the positions in the predetermined time intervals that are projected onto the virtual handwriting plane are calculated by the following equation:

$$x'_i = x_i - \frac{a(ax_i + by_i + cz_i + d)}{a^2 + b^2 + c^2}$$

$$y'_i = y_i - \frac{b(ax_i + bx_i + cz_i + d)}{a^2 + b^2 + c^2}$$

-continued $$z'_i = z_i - \frac{c(ax_i + bx_i + cz_i + d)}{a^2 + b^2 + c^2}$$

wherein $(x_i, y_i, z_i)$ are three-dimensional coordinates at a predetermined time tracked based on motion occurrences of the system body in the three-dimensional space, $(x_i', y_i', z_i')$ are coordinates obtained when an arbitrary position of $(x_i, y_i, z_i)$ is projected onto the virtual handwriting plane, and a, b, c, and d are parameters for the virtual handwriting plane.

* * * * *

UNITED STATES PATENT AND TRADEMARK OFFICE
CERTIFICATE OF CORRECTION

PATENT NO. : 7,580,572 B2
APPLICATION NO. : 10/801593
DATED : August 25, 2009
INVENTOR(S) : Bang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 965 days.

Signed and Sealed this

Fourteenth Day of September, 2010

David J. Kappos
*Director of the United States Patent and Trademark Office*